(12) United States Patent
Kimura

(10) Patent No.: US 9,535,485 B2
(45) Date of Patent: Jan. 3, 2017

(54) IMAGE PROCESSING APPARATUS, METHOD FOR CONTROLLING THE SAME AND STORAGE MEDIUM

(71) Applicant: CANON KABUSHIKI KAISHA, Tokyo (JP)

(72) Inventor: Tomohiro Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 289 days.

(21) Appl. No.: 13/919,285

(22) Filed: Jun. 17, 2013

(65) Prior Publication Data

US 2014/0013139 A1 Jan. 9, 2014

(30) Foreign Application Priority Data

Jul. 3, 2012 (JP) .................................. 2012-149753
May 8, 2013 (JP) .................................. 2013-098896

(51) Int. Cl.
*G06F 1/32* (2006.01)

(52) U.S. Cl.
CPC ........... *G06F 1/3234* (2013.01); *G06F 1/3209* (2013.01)

(58) Field of Classification Search
CPC .......... H04L 12/12; H04L 29/06; H04L 69/08; H04L 67/02; H04N 1/00209; H04N 2201/0093; H04N 21/237; H04N 21/437; Y02B 60/32; Y02B 60/34; G06F 1/3209; G06F 1/3234; G06Q 20/105; G06K 19/07732

See application file for complete search history.

(56) References Cited

U.S. PATENT DOCUMENTS

| 8,416,779 | B2* | 4/2013 | Fan | H04W 72/085 370/369 |
|---|---|---|---|---|
| 2004/0193733 | A1* | 9/2004 | Vangal et al. | 709/250 |
| 2007/0274254 | A1* | 11/2007 | Iwazaki | H04L 12/66 370/328 |
| 2008/0195688 | A1* | 8/2008 | Watanabe | H04L 12/12 709/201 |

(Continued)

FOREIGN PATENT DOCUMENTS

| JP | 2010-206241 | | 9/2010 |
|---|---|---|---|
| JP | 2010206241 | A * | 9/2010 |

*Primary Examiner* — Thomas Lee
*Assistant Examiner* — Chad Erdman
(74) *Attorney, Agent, or Firm* — Fitzpatrick, Cella, Harper & Scinto

(57) ABSTRACT

An image processing apparatus of one aspect of the present invention determines, upon receipt of a packet in a power saving state at a second communication rate slower than a first communication rate, whether or not to change the communication rate, on the basis of a communication protocol type and a port number, and an attribute of the packet represented by a data section of the packet. If the communication protocol type, the port number, and the attribute of the received packet indicate a request for a service predetermined as a network service that corresponds to the first communication rate, the image processing apparatus changes the communication rate from the second communication rate to the first communication rate at the time of shifting from the power saving state to the normal power state so as to provide the service.

8 Claims, 7 Drawing Sheets

IMAGE FORMING APPARATUS

(56) References Cited

U.S. PATENT DOCUMENTS

| | | | |
|---|---|---|---|
| 2009/0021757 A1* | 1/2009 | Liu | G06F 3/1207 |
| | | | 358/1.13 |
| 2011/0003592 A1* | 1/2011 | Matsumoto | H04W 48/16 |
| | | | 455/434 |
| 2011/0235535 A1* | 9/2011 | Furukawa | G06F 1/3203 |
| | | | 370/252 |
| 2013/0013842 A1* | 1/2013 | Numamoto et al. | 710/316 |
| 2013/0088749 A1* | 4/2013 | Park et al. | 358/1.15 |
| 2013/0155866 A1* | 6/2013 | Sun et al. | 370/241 |

* cited by examiner

IMAGE FORMING APPARATUS

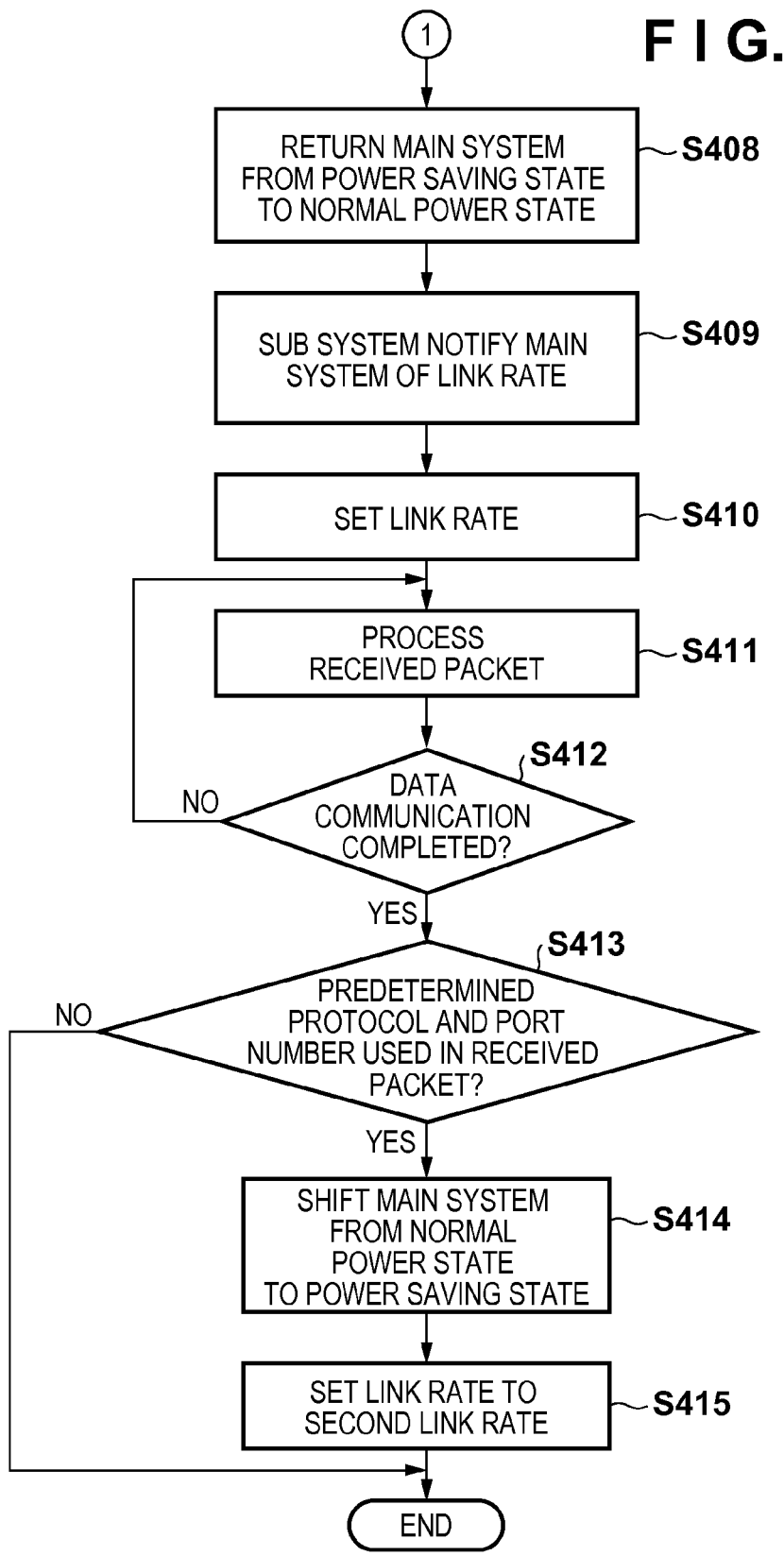

IMAGE PROCESSING APPARATUS, METHOD FOR CONTROLLING THE SAME AND STORAGE MEDIUM

BACKGROUND OF THE INVENTION

Field of the Invention

The present invention relates to an image processing apparatus, a method for controlling the same, and a storage medium.

Description of the Related Art

There are image processing apparatuses such as image forming apparatuses and image reading apparatuses that have, in addition to a normal power state, a power saving state for reducing standby power. For such image processing apparatuses, a technique for reducing, at the time of shifting from the normal power state to the power saving state, the link rate (communication rate) of communication via a network from a first link rate, that is used in the normal power state, to a second link rate, that is slower than the first link rate is known. This can achieve a reduction in power consumption. When a packet is received, an image processing apparatus in the power saving state generally returns from the power saving state to the normal power state and responds to the received packet.

Japanese Patent Laid-Open No. 2010-206241 describes a method in which an electronic device (image processing apparatus) in a power saving state decides, when a packet is received, a communication rate to be used after returning to a normal power state on the basis of a protocol and a port number included in the received packet. In this method, the communication rate is changed from a second (slow) communication rate to a first (fast) communication rate only if needed, such as when a large amount of data is transmitted or received, resulting in a reduction in the number that the communication rate is changed. That is, by deciding the communication rate (link rate) based on a protocol and a port number included in the received packet, it is possible to change the communication rate only if transmission or reception of a large amount of data occurs, for example, in the case of a print request. This can reduce the frequency of link disconnection that occurs when the communication rate is changed, and suppress occurrence of network errors and the like of the device.

However, in Japanese Patent Laid-Open No. 2010-206241, the image processing apparatus decides the communication rate (link rate) only on the basis of a protocol and a port number included in the received packet. Accordingly, there may be the case where the image processing apparatus cannot decide an appropriate link rate when the image processing apparatus provides a plurality of network services that have the same protocol and port number but different amounts of data communication.

For example, assume that the image processing apparatus provides hypertext transfer protocol (HTTP) access and internet printing protocol (IPP) printing as network services. HTTP and IPP are both transmission control protocols (TCPs) and both use the port number 80. The HTTP access used in the image processing apparatus is mainly used for accessing a remote user interface (UI). Therefore, such HTTP access performs communication of small amounts of data, and thus the first (fast) link rate is not required, and the second link rate that is slower than the first link rate is sufficient. Meanwhile, in the IPP printing, data communication of large amounts of print data occurs, and thus the first (fast) link rate may be required.

Also, with the simple network management protocol (SNMP), different from the above examples of HTTP access and IPP printing, there are cases where communication of a large amount of data occurs and cases where communication of a small amount of data occurs, for each information request. Therefore, when an SNMP packet is received, the image processing apparatus needs to determine, on the basis of the received packet, whether or not communication of a large amount of data will occur so as to decide which of the first (fast) link rate and the second (slow) link rate to use.

SUMMARY OF THE INVENTION

The present invention was made in view of the above-described problems. The present invention provides a technique in which upon receipt of a packet including a request for a network service, an image processing apparatus performs communication at an appropriate communication rate corresponding to the requested network service.

According to one aspect of the present invention, there is provided an image processing apparatus that is capable of performing communication at a first communication rate or a second communication rate slower than the first communication rate in a normal power state, and is capable of performing communication at the second communication rate in a power saving state in which less power is consumed than in the normal power state, the image processing apparatus comprising: a receiving unit configured to receive, in the power saving state, a packet including a request for a network service from an external apparatus via a network at the second communication rate; a determination unit configured to determine, when the receiving unit receives the packet in the power saving state, whether or not a communication protocol type and a port number that are designated in the packet and an attribute of the packet represented by a data section of the packet indicate a request for a predetermined service, the predetermined service being determined in advance as a network service that requires the first communication rate; a changing unit configured to change, if it is determined by the determination unit that the communication protocol type, the port number, and the attribute indicate the request for the predetermined service, a communication rate from the second communication rate to the first communication rate; a control unit configured to shift the image processing apparatus from the power saving state to the normal power state in response to receipt of the packet; and a service providing unit configured to provide, when the image processing apparatus shifts from the power saving state to the normal power state, the network service requested by the packet at the second communication rate, or at the first communication rate if the communication rate is changed by the changing unit.

According to another aspect of the present invention, there is provided a method for controlling an image processing apparatus that is capable of performing communication at a first communication rate or a second communication rate slower than the first communication rate in a normal power state, and is capable of performing communication at the second communication rate in a power saving state in which less power is consumed than in the normal power state, the method comprising: a receiving step of receiving, in the power saving state, a packet including a request for a network service from an external apparatus via a network at the second communication rate; a determining step of determining, when the packet is received in the power saving state, whether or not a communication protocol type and a port number that are designated in the packet and an attribute of the packet represented by a data section of the packet indicate a request for a predetermined service, the predetermined service being determined in advance as a network service that requires the first communication rate; a changing step of changing, if it is determined in the determining step that the communication protocol type, the port number, and the attribute indicate the request for the predetermined service, a communication rate from the second communication rate to the first communication rate; a shifting step of shifting the image processing apparatus from the power saving state to the normal power state in response to receipt of the packet; and a providing step of a service providing unit providing, when the image processing apparatus shifts from the power saving state to the normal power state, the network service requested by the packet at the second communication rate, or at the first communication rate if the communication rate is changed in the changing step.

According to another aspect of the present invention, there is provided a computer-readable storage medium storing a computer program for causing a computer to execute steps of the method for controlling an image processing apparatus that is capable of performing communication at a first communication rate or a second communication rate slower than the first communication rate in a normal power state, and is capable of performing communication at the second communication rate in a power saving state in which less power is consumed than in the normal power state, the method comprising: a receiving step of receiving, in the power saving state, a packet including a request for a network service from an external apparatus via a network at the second communication rate; a determining step of determining, when the packet is received in the power saving state, whether or not a communication protocol type and a port number that are designated in the packet and an attribute of the packet represented by a data section of the packet indicate a request for a predetermined service, the predetermined service being determined in advance as a network service that requires the first communication rate; a changing step of changing, if it is determined in the determining step that the communication protocol type, the port number, and the attribute indicate the request for the predetermined service, a communication rate from the second communication rate to the first communication rate; a shifting step of shifting the image processing apparatus from the power saving state to the normal power state in response to receipt of the packet; and a providing step of a service providing unit providing, when the image processing apparatus shifts from the power saving state to the normal power state, the network service requested by the packet at the second communication rate, or at the first communication rate if the communication rate is changed in the changing step.

According to the present invention, it is possible to provide a technique in which upon receipt of a packet including a request for a network service, an image processing apparatus performs communication at an appropriate communication rate corresponding to the requested network service.

Further features of the present invention will become apparent from the following description of exemplary embodiments (with reference to the attached drawings).

BRIEF DESCRIPTION OF THE DRAWINGS

FIGS. 4A and 4B are flowcharts illustrating a processing procedure that is executed in the image forming apparatus 100 according to the first and second embodiments of the present invention.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

The following first and second embodiments describe a case where the present invention is applied to an image forming apparatus such as a printer or a multi-function peripheral (MFP), as an example of an image processing apparatus to which the present invention is applied. The present invention is also applicable to an image reading apparatus.

First Embodiment

The following first describes control of a communication rate when an image forming apparatus shifts (returns) from a power saving state to a normal power state as well as shifts from the normal power state to the power saving state in the first embodiment. The first embodiment describes HTTP access and IPP printing, as examples of packets received by the image forming apparatus that have the same communication protocol and port number designated in the packets but different packet formats. However, the present invention is not limited to HTTP access and IPP printing, and is also applicable to communication protocols, port numbers, and packet/body configurations different from those of HTTP access and IPP printing.

(Network Configuration)

Figure 1:
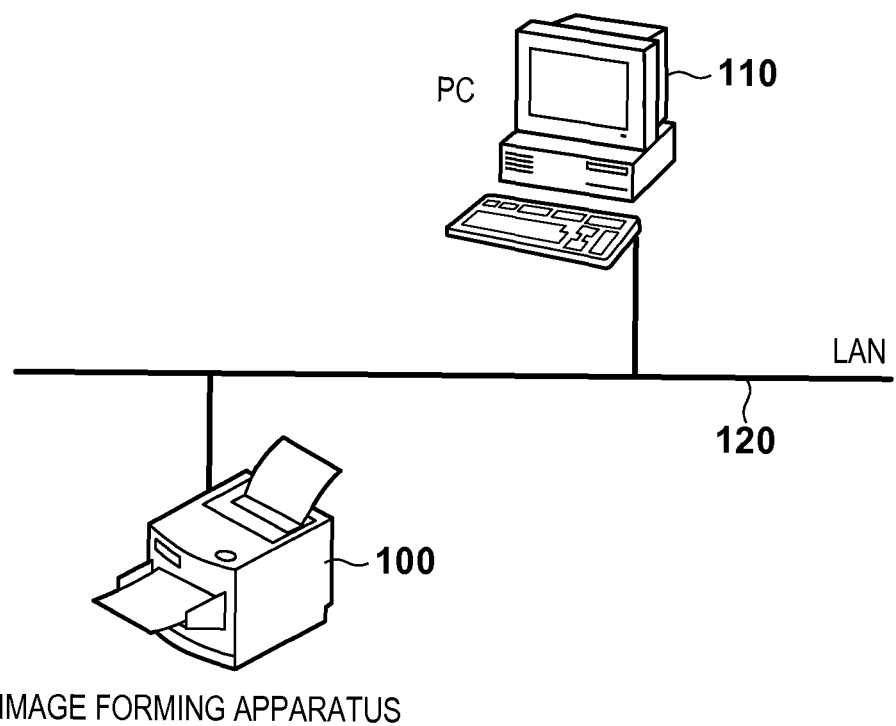
FIG. 1 illustrates a network configuration of first and second embodiments of the present invention.

FIG. 1 illustrates a configuration of a network including an image forming apparatus 100. The image forming apparatus 100 is connected to a PC 110 via a LAN 120. The image forming apparatus 100 and the PC 110 are capable of communicating with each other via the LAN 120. The image forming apparatus 100, which is an example of the image processing apparatus of the present invention, controls the communication rate (link rate) of communication via the LAN 120 when changing the power state between the power saving state and the normal power state.

(Hardware Configuration of the Image Forming Apparatus 100)

Figure 2:
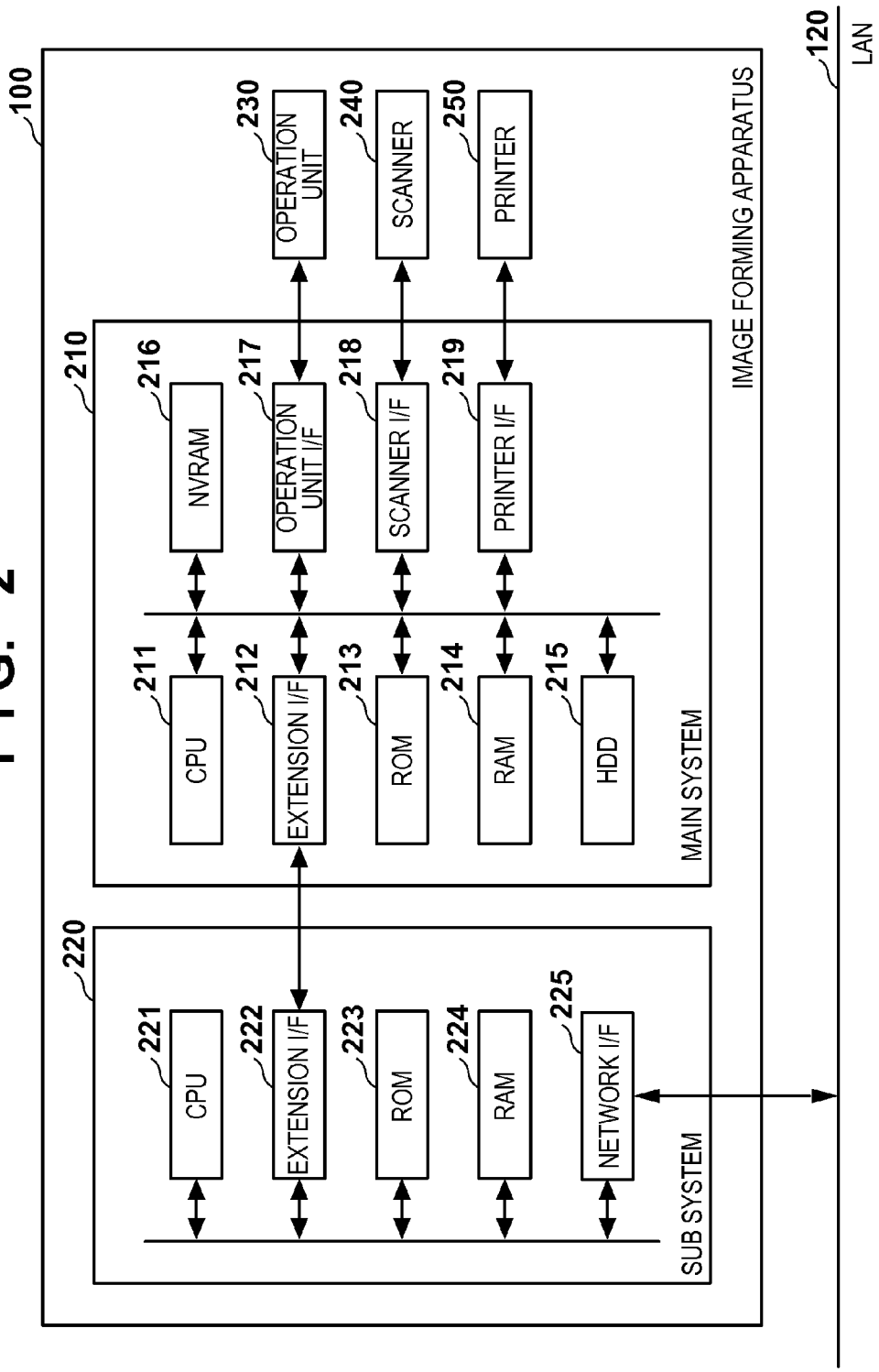
FIG. 2 is a block diagram illustrating a hardware configuration of an image forming apparatus 100 according to the first and second embodiments of the present invention.

FIG. 2 is a block diagram illustrating a hardware configuration of the image forming apparatus 100. The image forming apparatus 100 includes a main system 210, a sub system 220, an operation unit 230, a scanner 240, and a printer 250. The main system 210 is connected to the LAN 120 via the sub system 220.

The main system 210 includes a CPU 211, an extension interface (I/F) 212, a read only memory (ROM) 213, a random access memory (RAM) 214, a hard disk drive (HDD) 215, an NVRAM 216, an operation unit I/F 217, a scanner I/F 218, and a printer I/F 219, and these components are connected to each other via a bus. The sub system 220 includes a CPU 221, an extension I/F 222, a ROM 223, a RAM 224, and a network I/F 225, and these components are connected to each other via a bus.

In the main system 210, the CPU 211 performs overall control of the device by executing a software program for the main system 210. The RAM 214 temporarily stores data that is used when the CPU 211 controls the device. The ROM 213 stores a boot program, fixed parameters, and the like of the device. The HDD 215 stores various types of data that is used in the image forming apparatus 100. The NVRAM 216 is a nonvolatile memory, and stores various types of set values in the main system 210.

The operation unit I/F 217 controls the operation unit 230 in accordance with an instruction from the CPU 211 to display various types of operation screens on a liquid crystal panel provided on the operation unit 230, and transmits an instruction input by a user via the operation screen to the CPU 211. The scanner I/F 218 controls the scanner 240 in accordance with an instruction from the CPU 211. The scanner 240 reads an image on a document to generate image data. The printer I/F 219 controls the printer 250 in accordance with an instruction from the CPU 211. The printer 250 prints an image based on the image data onto a recording medium.

The extension I/F 212 is connected to the extension I/F 222 in the sub system 220. The extension I/F 212 controls data communication between the main system 210 and the sub system 220, and controls data communication with an external apparatus (for example, the PC 110) on the LAN 120 via the extension I/F 222 (in the sub system 220).

In the sub system 220, the CPU 221 performs overall control of the device by executing a software program for the sub system 220. The RAM 224 temporarily stores data that is used when the CPU 221 controls the device. The ROM 223 stores a boot program, fixed parameters, and the like of the device.

The extension I/F 222 is connected to the extension I/F 212 in the main system 210. The extension I/F 222 controls data communication between the main system 210 and the sub system 220. The network I/F 225 is connected to the LAN 120, and controls data communication between the sub system 220 (or the main system 210) and an external apparatus (for example, the PC 110) on the LAN 120. That is, the network I/F 225 controls data communication between the image forming apparatus 100 and an external apparatus on the LAN 120.

The image forming apparatus 100 has the normal power state, and the power saving state in which less power is consumed than in the normal power state, and operates in either state. In the normal power state, the image forming apparatus 100 can perform communication at a first communication rate (first link rate) or a second communication rate (second link rate) that is slower than the first communication rate. In the power saving state, the image forming apparatus 100 can perform communication at the second communication rate. In the normal power state, power is supplied to both the main system 210 and the sub system 220. In the power saving state, while power supply to the main system 210 is stopped, power is supplied to the sub system 220. This is because the sub system 220 operates with an application specific integrated circuit (ASIC) that is different from that of the main system 210, and therefore even in a state where power supply to the main system 210 is stopped, power supply to the sub system 220 is continued.

When the image forming apparatus 100 is in the power saving state, power is not supplied to the main system 210, so the main system 210 is also in the power saving state. On the other hand, when the image forming apparatus 100 is in the normal power state, power is supplied to the main system 210, so the main system 210 is also in the normal power state. When the main system 210 shifts to the power saving state (that is, the image forming apparatus 100 shifts to the power saving state), the sub system 220 can operate by changing the first link rate used when the main system 210 is in the normal power state to the second link rate. Note that power is supplied as needed to the operation unit 230, the scanner 240, and the printer 250 that are controlled by the main system 210, when an operation is actually performed in the normal power state.

(Software Configuration of the Image Forming Apparatus 100)

Figure 3:
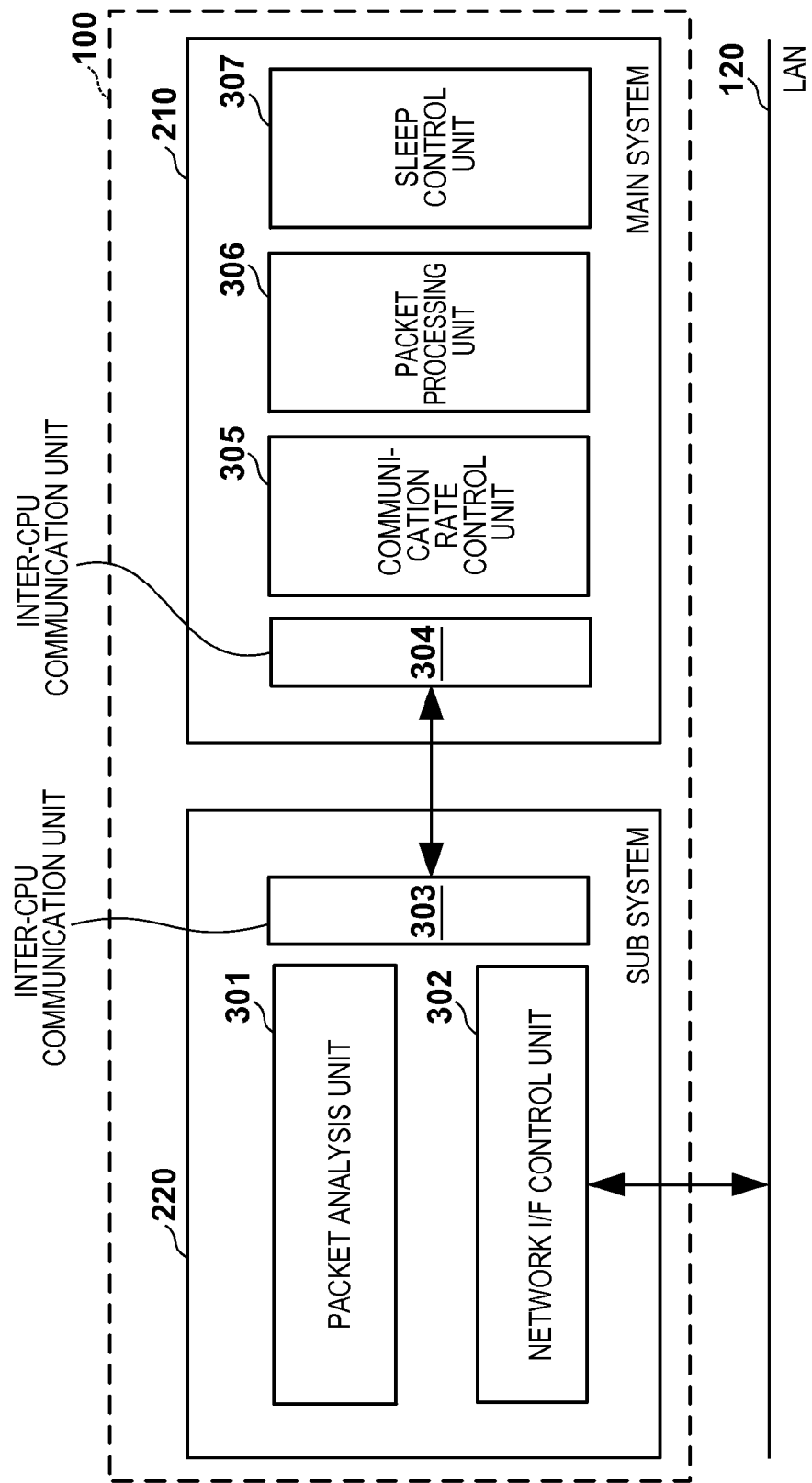
FIG. 3 is a block diagram illustrating a software configuration of the image forming apparatus 100 according to the first and second embodiments of the present invention.

FIG. 3 is a block diagram illustrating a software configuration of the image forming apparatus 100. Functions of blocks included in the main system 210 shown in FIG. 3 are realized on the image forming apparatus 100 as functions of the main system 210, by the CPU 211 executing the software program for the main system 210. Also, functions of blocks included in the sub system 220 are realized on the image forming apparatus 100 as functions of the sub system 220, by the CPU 221 executing the software program for the sub system 220.

The sub system 220 includes a packet analysis unit 301, a network I/F control unit 302, and an inter-CPU communication unit 303. The main system 210 includes an inter-CPU communication unit 304, a communication rate control unit 305, a packet processing unit 306, and a sleep control unit 307.

The inter-CPU communication unit 303 controls the extension I/F 222 and thereby performs transmission/reception of data, such as a packet or a link rate change notification, between the main system 210 and the sub system 220. Also, the inter-CPU communication unit 304 controls the extension I/F 212 and thereby performs transmission/reception of data between the main system 210 and the sub system 220.

The network I/F control unit 302 controls transmission/reception of a packet by the network I/F 225. The network I/F control unit 302 constantly aware of whether the main system 210 is in the normal power state or the power saving state (whether the image forming apparatus 100 is in the normal power state or the power saving state). The network I/F control unit 302 transfers a packet received from the LAN 120 to the main system 210 when the image forming apparatus 100 is operating in the normal power state. On the other hand, the network I/F control unit 302 sends a packet received from the LAN 120 to the packet analysis unit 301 when the image forming apparatus 100 is operating in the power saving state. In the present embodiment, when the image forming apparatus 100 is in the power saving state, the network I/F control unit 302 can receive a packet including a request for a network service via the network (LAN 120) at the second link rate.

The packet analysis unit 301 operates only when the image forming apparatus 100 is in the power saving state, that is, when the main system 210 is in the power saving state and power supply to the main system 210 is stopped. The packet analysis unit 301 analyzes the packet received from the network I/F control unit 302, and shifts the main system 210 from the power saving state to the normal power state if the packet needs to be processed in the main system 210. In this manner, the packet analysis unit 301, in response to receipt of the packet, shifts the main system 210 from the power saving state to the normal power state, and thereby shifts the image forming apparatus 100 itself from the power saving state to the normal power state. Note that the sleep control unit 307 of the main system 210 controls the switching between the normal power state and the power saving state of the image forming apparatus 100 when power is supplied to the main system 210.

Also, the packet analysis unit 301 holds therein conditions (communication protocols, port numbers, and packet attributes indicated in the data section (body) of a packet) for deciding a link rate to be used after the image forming apparatus 100 shifts from the power saving state to the normal power state. Upon receipt of a packet by the network I/F control unit 302, the packet analysis unit 301 compares the received packet with the above conditions, decides a link rate, and notifies the main system 210 of the decided link rate when shifting the main system 210 from the power saving state to the normal power state. This notification of the link rate is sent from the packet analysis unit 301 to the inter-CPU communication unit 304 via the inter-CPU communication unit 303.

Upon receipt of the notification of a link rate from the sub system 220 via the inter-CPU communication unit 304, the main system 210 sends the received notification to the communication rate control unit 305. The communication rate control unit 305 decides a link rate in the normal power state according to the received notification. Note that the packet received by the sub system 220 via the LAN 120 is transferred to the main system 210 from the sub system 220 via the inter-CPU communication unit 304. The main system 210 sends the received packet to the packet processing unit 306 and causes the packet processing unit 306 to execute processing that corresponds to the packet. Accordingly, the main system 210 provides the external apparatus (for example, the PC 110) that is the packet transmission source with a network service requested in the received packet. The main system 210 is therefore an example of a service providing unit.

(Procedures for Processing a Received Packet)

Figure 4A:
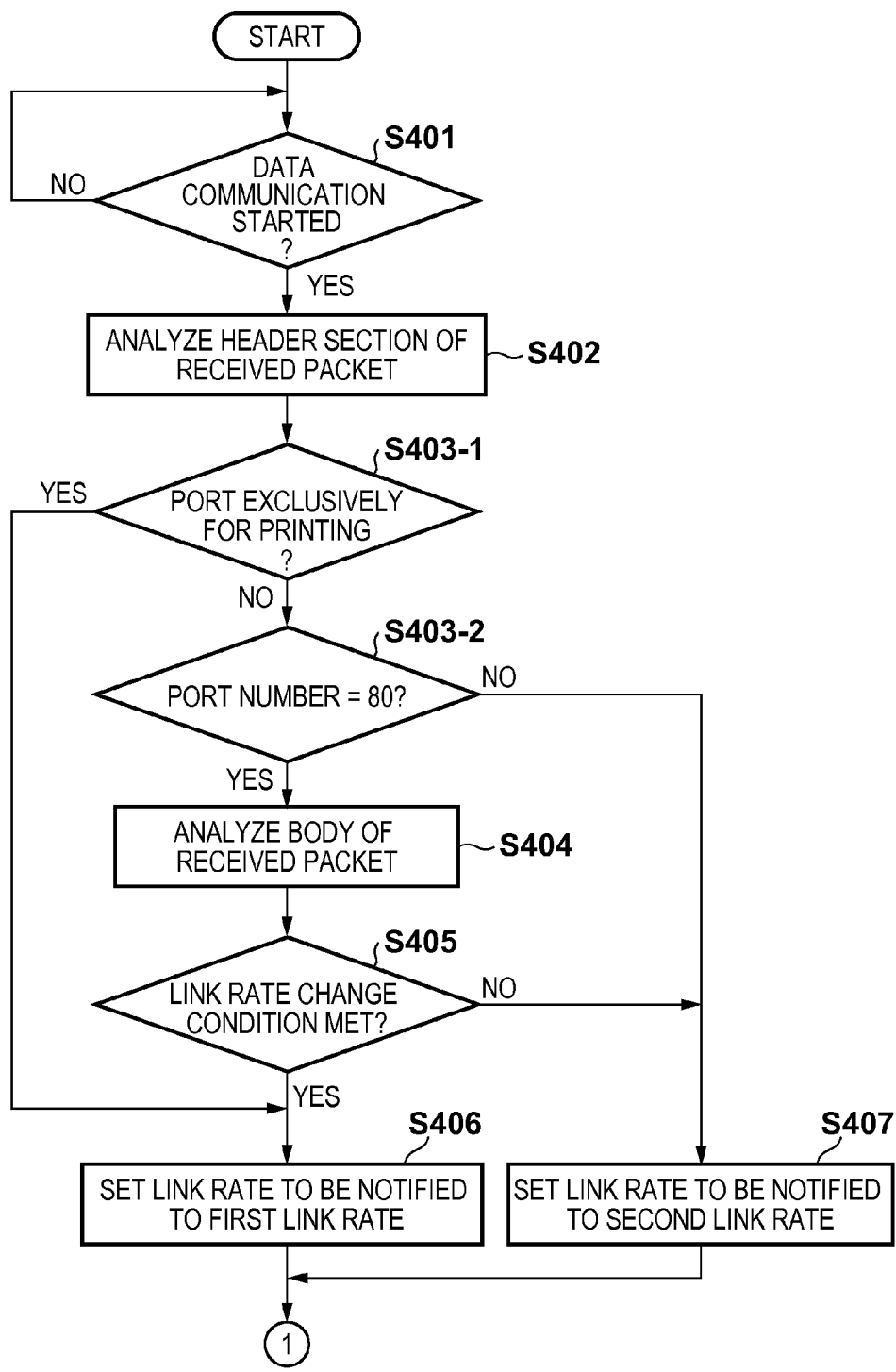

FIGS. 4A and 4B are flowcharts illustrating procedures in which the image forming apparatus 100 in the power saving state processes a packet received from an external apparatus (for example, the PC 110) via the LAN 120. The present embodiment describes a case in which the image forming apparatus 100 provides HTTP access and IPP printing as network services.

First, the image forming apparatus 100 is assumed to be in the power saving state, and power supply to the main system 210 has therefore been stopped but power is supplied to the sub system 220. In step S401, the network I/F control unit 302 determines whether or not a packet has been received from an external apparatus via the network I/F 225, and thereby determines whether or not to start data communication. If it is determined in step S401 that a packet has been received from an external apparatus (here, the PC 110), the network I/F control unit 302 determines to start data communication. In the case of TCP communication, the network I/F control unit 302 establishes communication with the PC 110 by three-way handshaking. Thereafter, the network I/F control unit 302 advances the processing to step S402.

The procedures in steps S402 to S409 are executed by the packet analysis unit 301. First, in steps S402 to S405, the packet analysis unit 301 determines whether or not the communication protocol type and the port number that are designated in the received packet and an attribute of the packet represented by the data section of the packet indicate a request for a predetermined service. Here, the predetermined service corresponds to a network service that requires the first communication rate. In the present embodiment, IPP printing is assumed to be such a network service. In contrast, HTTP access does not require the first communication rate, and can provide the service at the second communication rate.

In step S402, the packet analysis unit 301 analyzes an IP header section and a TCP header section of the received packet, and identifies the communication protocol designated in the IP header section and the port number designated in the TCP header section. Next, in step S403-1, the packet analysis unit 301 determines whether or not the communication protocol and the port number are a communication protocol and a port number that are used exclusively for printing. For example, LPR (TCP 515), RAW (TCP 9100) and the like correspond to communication protocols and port numbers that are used exclusively for printing. If it is determined in step S403-1 that the communication protocol and the port number are exclusively for printing, the processing advances to step S406. On the other hand, if it is determined in step S403-1 that the communication protocol and the port number are not exclusively for printing, the packet analysis unit 301 further determines in step S403-2 whether or not the communication protocol and the port number identified in step S402 are a communication protocol and a port number that require a determination regarding link rate change conditions. In the present embodiment, the packet analysis unit 301 determines whether or not the communication protocol is TCP and the port number is 80, as an example. Here, if it is determined that the communication protocol is TCP and the port number is 80, the packet analysis unit 301 advances the processing to step S404, and otherwise advances the processing to step S407.

In step S404, the packet analysis unit 301 analyzes (references) the body (data section) of the received packet. In step S405, the packet analysis unit 301 determines, on the basis of information analyzed in step S404, whether or not an attribute of the received packet represented by the data section meets the link rate change conditions. Specifically, the packet analysis unit 301 determines whether the attribute of the packet represented by the data section of the received packet corresponds to an HTTP access request (information request) or an IPP print request (print request). That is, the packet analysis unit 301 determines whether the received packet is an HTTP access packet or an IPP printing packet. Here, if it is determined that the attribute of the received packet meets the change conditions, the packet analysis unit 301 advances the processing to step S406, and otherwise advances the processing to step S407.

In the present embodiment, if it is determined in step S405 that the received packet is an HTTP packet, the packet analysis unit 301 advances the processing to step S407, and sets the link rate to be notified to the main system 210 to the second communication rate. On the other hand, if it is determined that the received packet is an IPP packet, the packet analysis unit 301 advances the processing to step S406, and sets the link rate to be notified to the main system 210 to the first communication rate. In this manner, if the packet analysis unit 301 determines that the communication protocol type and the port number that are designated in the received packet and the attribute represented by the data section indicate a request for the predetermined service (IPP printing), the packet analysis unit 301 changes the communication rate from the second link rate to the first link rate.

In step S408 after step S406 or S407, the sub system 220 (packet analysis unit 301) transmits a WakeUp signal to the main system 210, and shifts (returns) the main system 210 from the power saving state to the normal power state. Accordingly, the sub system 220, in response to receipt of the packet, shifts the image forming apparatus 100 from the power saving state to the normal power state. Then, in step S409, the packet analysis unit 301 (sub system 220) notifies the main system 210 of the link rate set in step S406 or S407. This notification is transmitted to the communication rate control unit 305 via communication between the inter-CPU communication unit 303 and the inter-CPU communication unit 304. After completion of the notification, the processing shifts from the sub system 220 to the main system 210.

In step S410, the communication rate control unit 305 sets the link rate notified by the sub system 220 in step S409 as the communication rate (link rate) of communication in the normal power state. Here, if the second link rate is notified by the sub system 220, the communication rate control unit 305 will not need to change the link rate from the second link rate set in the power saving state. Therefore, it is not necessary for the communication rate control unit 305 to perform link disconnection and reestablishment involved in a change in the link rate. On the other hand, if the first link rate is notified by the sub system 220, in order to change the link rate, the communication rate control unit 305 will need to disconnect the link (communication) established to the PC 110, and to reestablish a link at the first link rate after the change.

After the procedure in step S410 ends, in step S411, the packet processing unit 306 processes the packet received from the PC 110 via the sub system 220 at the second link rate, or at the first link rate if the link rate has been changed. Accordingly, the packet processing unit 306 (main system 210) provides the PC 110 with a network service requested by the received packet at a link rate compatible with the network service.

Specifically, if the received packet is an HTTP access packet, the packet processing unit 306 returns a response packet to the PC 110 in response to the information request. On the other hand, if the received packet is an IPP printing packet, the packet processing unit 306 transmits a request for execution of print processing to the printer 250 via the printer I/F 218, and thereby causes the printer 250 to execute the print processing.

Then, in step S412, the packet processing unit 306 determines whether or not the processing of the received packet is completed, and thereby determines whether or not data communication with the PC 110 has been completed. If the packet processing unit 306 determines that the data communication has been completed, the processing advances to step S413.

The image forming apparatus 100 may shift from the normal power state to the power saving state in response to completion of the data communication, or may continue in the normal power state. By operating in the power saving state during a period in which data communication is not performed after the completion of data communication, the image forming apparatus 100 can reduce power consumption. Alternatively, the image forming apparatus 100 may select whether to shift from the normal power state to the power saving state or to continue in the normal power state, on the basis of a predetermined criterion.

The following will describe, as an example, a case where the image forming apparatus 100 suitably selects, in steps S413 to S415, whether to shift from the normal power state to the power saving state or to continue to be in the normal power state, on the basis of the predetermined criterion. In step S413, the sleep control unit 307 determines whether or not the communication protocol and the port number that are designated (used) in the received packet processed by the packet processing unit 306 are a predetermined communication protocol and a predetermined port number. Here, the predetermined communication protocol and port number are assumed to be the communication protocol and the port number used in the determination processing in step S403-2 that require a determination regarding link rate change conditions.

If the sleep control unit 307 determines in step S413 the communication protocol and the port number that are designated in the received packet are the predetermined communication protocol and port number, the processing advances to step S414. In step S414, the sleep control unit 307 shifts the main system 210 from the normal power state to the power saving state, and returns the processing to the sub system 220. With this, the sub system 220 shifts the entire image forming apparatus 100 from the normal power state to the power saving state. Then, in step S415, the network I/F control unit 302 sets the link rate to the second link rate corresponding to the power saving state, and ends the processing. That is, if the image forming apparatus 100 changed the link rate from the second link rate to the first link rate at the time of shifting from the power saving state to the normal power state, the network I/F control unit 302, in step S415, changes the link rate from the first link rate to the second link rate.

On the other hand, if the sleep control unit 307 determines in step S413 that the communication protocol and the port number designated in the received packet are not the predetermined communication protocol and port number, the processing directly ends. That is, the sleep control unit 307 maintains thereafter the normal power state and the link rate (here, the second link rate) set at that time, without shifting the main system 210 from the normal power state to the power saving state. Note that the sleep control unit 307 may continue thereafter to control switching between the normal power state and the power saving state of the image forming apparatus 100, and shift the image forming apparatus 100 from the normal power state to the power saving state as needed.

(An Example of Processing in Steps S402 to S405)

Figure 5:
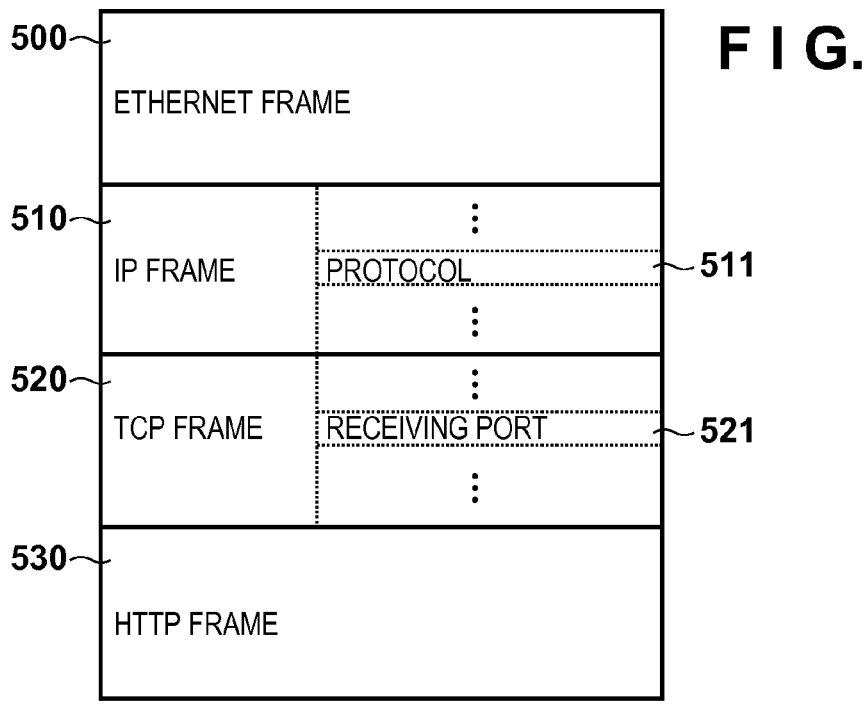
FIG. 5 illustrates an example of an HTTP packet in the first embodiment of the present invention.

Hereinafter, an example of the procedures in steps S402 to S405 will be described with reference to FIGS. 5 and 6. FIG. 5 illustrates an example of a packet for HTTP access (information request). In the packet, an Ethernet (Registered Trademark) frame 500 is defined by IEEE 802.3. An IP frame 510 is defined by RFC 791 and referenced to determine the communication protocol type (S402, S403-1, and S403-2). In the present embodiment, if the value of a protocol field 511 of the IP frame 510 is "0x06", it is determined that TCP is designated and the received packet is a TCP packet. A TCP frame 520 is defined by RFC 793 and referenced to determine a port number (S402, S403-1, and S403-2). In the present embodiment, if the value of a destination port field 521 of the TCP frame 520 is "0x0050", it is determined that the port number 80 is designated as the port number for use in communication.

An HTTP frame 530 is defined by RFC 2616, and in the present embodiment, information included in the HTTP frame 530 is processed as the packet body (data section) (S404, S405). If an HTTP header such as "GET/HTTP/1.1" is set in the HTTP frame 530, the received packet is determined to be a packet for HTTP access (information request). In this manner, an attribute of the packet is determined based on a character string included in the packet body of the received packet.

Figure 6:
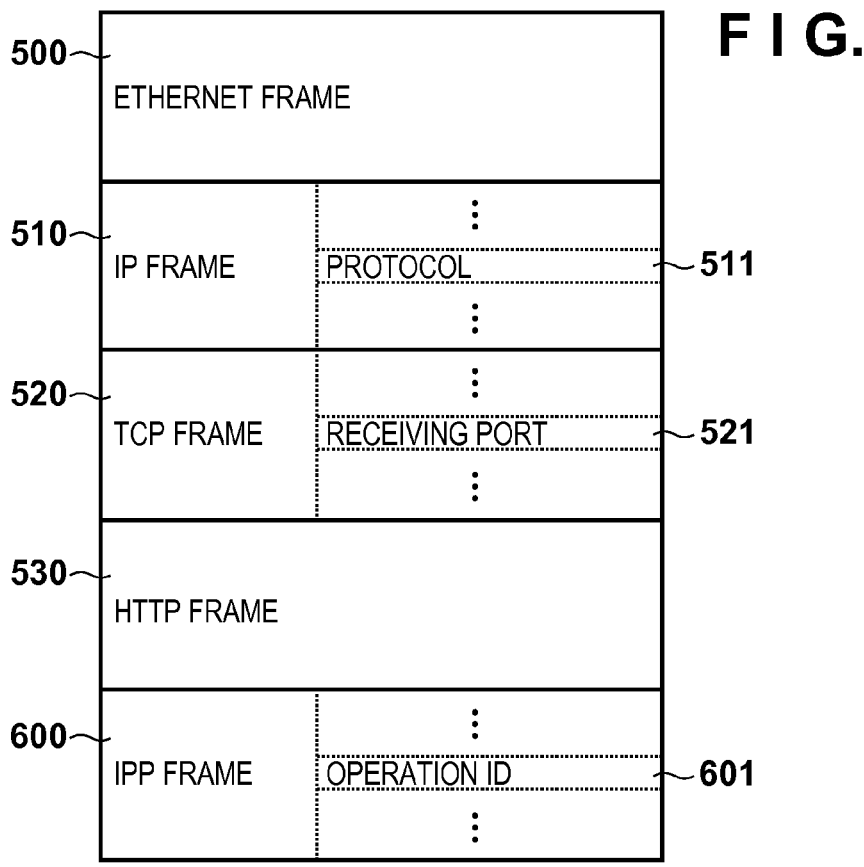
FIG. 6 illustrates an example of an IPP packet in the first embodiment of the present invention.

FIG. 6 illustrates an example of a packet for IPP printing (print request). In the packet, similar to the case in the above-described HTTP access, a communication protocol type and a port number are determined with reference to the protocol field 511 and the destination port field 521 (S402, S403-1, and S403-2).

In the present embodiment, the information included in the HTTP frame 530 is processed as the packet body (data section) (S404, S405), similarly to the case in HTTP access. If an IPP header such as "POST/IPP/1.1" is set in the HTTP frame 530, the received packet is determined to be an IPP packet. Further, an IPP frame 600 is defined by RFC 2566 and referenced as the packet body to determine whether or not the received packet includes a print job request (print request) (S405, S405). If the value of an operation field 601 of the IPP frame 600 is "0x0002", the received packet is determined to be a packet for a print job request (print request).

As has been described above, in the present embodiment, if the image forming apparatus receives a packet in the power saving state at the second link rate that is slower than the first link rate, the image forming apparatus determines whether or not to change the link rate, on the basis of a communication protocol type, a port number, and an attribute of the packet represented by the data section of the packet. Specifically, if the communication protocol type, the port number, and the attribute of the received packet indicate a request for a service that is predetermined as a network service corresponding to the first link rate, the image forming apparatus changes the link rate from the second link rate to the first link rate. Further, the image forming apparatus shifts from the power saving state to the normal power state, and provides the requested service at the second link rate or at the first link rate if the link rate has been changed to the first link rate.

Therefore, if provision of a service necessitates communication of a large amount of data, as in the case of IPP printing, the image forming apparatus changes the link rate from the slow second link rate to the fast first link rate at the time of shifting from the power saving state to the normal power state. Accordingly, it is possible to prevent network errors and the like that may be caused by providing a service without changing (from) the second link rate. That is, if the image processing apparatus receives a packet including a request for a network service, the image processing apparatus can perform communication at an appropriate communication rate that corresponds to the requested network service.

Also, according to the present embodiment, not only the communication protocol and the port number that are designated in a received packet but also an attribute of the packet are used as link rate change conditions. Therefore, even in the case where communication protocols and port numbers are the same but different amounts of data are communicated at the time of providing a service, as with the case in HTTP access and IPP printing, it is possible to set the link rate appropriately so as to provide the service. That is, it is possible to appropriately discriminate the network service requested by the packet received in the power saving state, and to provide the discriminated network service at the link rate that corresponds to the service.

Second Embodiment

The following describes control of the communication rate when the image forming apparatus shifts (returns) from the power saving state to the normal power state as well as shifts from the normal power state to the power saving state in the second embodiment. In the second embodiment, SNMP access will be described, as an example in which packets received by the image forming apparatus have the same communication protocols and port numbers that are designated in the packets but different packet formats. In the following, description common to that of the first embodiment will be omitted as much as possible.

SNMP access corresponds to an information request, but the amount of communication involved in provision of a service differs depending on whether the operation is "GetNextRequest" or "Get-Request". In the case of "Get-NextRequest", provision of a service requires that communication be performed successively a plurality of times and a large amount of data is likely to be communicated. Therefore, if the image forming apparatus 100 receives a "GetNextRequest" packet in the power saving state, it is necessary to change the link rate from the second link rate to the first link rate and return to the normal power state, as well as providing the service. On the other hand, in the case of "Get-Request", provision of a service is likely to require that communication be performed only once. Therefore, if the image forming apparatus 100 receives a "Get-Request" packet, the image forming apparatus 100 can provide the service after returning to the normal power state while maintaining the second link rate.

Next, procedures for processing a packet received from an external apparatus (for example, the PC 110) via the LAN 120 when the image forming apparatus 100 is in the power saving state will be described with reference to FIGS. 4A and 4B. The present embodiment, different from the first embodiment, describes a case where the image forming apparatus 100 provides SNMP access as a network service.

In FIGS. 4A and 4B, step S401 is equivalent to that in the first embodiment. In steps S402 to S405, the packet analysis unit 301 determines whether or not the communication protocol type and the port number that are designated in the received packet and the attribute of the packet represented by the data section of the packet indicate a request for a predetermined service. Here, the predetermined service corresponds to a network service that requires the first communication rate. In the present embodiment, "Get-NextRequest" of SNMP access is assumed to be such a network service. On the other hand, "Get-Request" of SNMP access does not require the first communication rate, and can provide the service at the second communication rate.

In step S402, the packet analysis unit 301 analyzes the IP header section and the TCP header section of the received packet, and identifies the communication protocol designated in the IP header section and the port number designated in the TCP header section. Next, in step S403-1, the packet analysis unit 301 determines whether or not the communication protocol and the port number are a communication protocol and a port number that are used exclusively for printing. For example, LPR (TCP 515), RAW (TCP 9100) and the like correspond to communication protocols and port numbers that are used exclusively for printing. If it is determined in step S403-1 that the communication protocol and the port number are exclusively for printing, the processing advances to step S406. On the other hand, if it is determined in step S403-1 that the communication protocol and the port number are not exclusively for printing, the packet analysis unit 301 further determines in step S403-2 whether or not the communication protocol and the port number identified in step S402 are a communication protocol and a port number that require a determination regarding link rate change conditions. In the present embodiment, the packet analysis unit 301 determines whether or not the communication protocol is a user datagram protocol (UDP) and the port number is 161, as an example. Here, if it is determined that the communication protocol is a UDP and the port number is 161, the packet analysis unit 301 advances the processing to step S404, and otherwise advances the processing to step S407.

In step S404, the packet analysis unit 301 analyzes (references) the body (data section) of the received packet. In step S405, the packet analysis unit 301 determines, on the basis of information analyzed in step S404, whether or not an attribute of the received packet represented by the data section meets the link rate change conditions. Specifically, the packet analysis unit 301 determines whether the attribute of the packet represented by the data section of the received packet indicates "Get-NextRequest" or "Get-Request" by SNMP access. That is, the packet analysis unit 301 determines whether the received packet is a "Get-NextRequest" packet or a "Get-Request" packet. Here, if it is determined that the attribute of the received packet meets the change conditions, the packet analysis unit 301 advances the processing to step S406, and otherwise advances the processing to step S407.

In the present embodiment, if it is determined in step S405 that the received packet is a "Get-Request" packet, the packet analysis unit 301 advances the processing to step S406 and sets the link rate to be notified to the main system 210 to the second communication rate. On the other hand, if it is determined in step S405 that the received packet is a "Get-NextRequest" packet, the packet analysis unit 301 advances the processing to step S407 and sets the link rate to be notified to the main system 210 to the first communication rate. In this manner, if the packet analysis unit 301 determines that the communication protocol type and the port number that are designated in a received packet and the attribute represented by the data section indicate a request for the predetermined service ("Get-NextRequest" by SNMP access), the packet analysis unit 301 changes the communication rate from the second link rate to the first link rate.

Steps S408 to S415 after step S406 or S407 are equivalent to those in the first embodiment.

(An Example of Processing in Steps S402 to S405)

Figure 7:
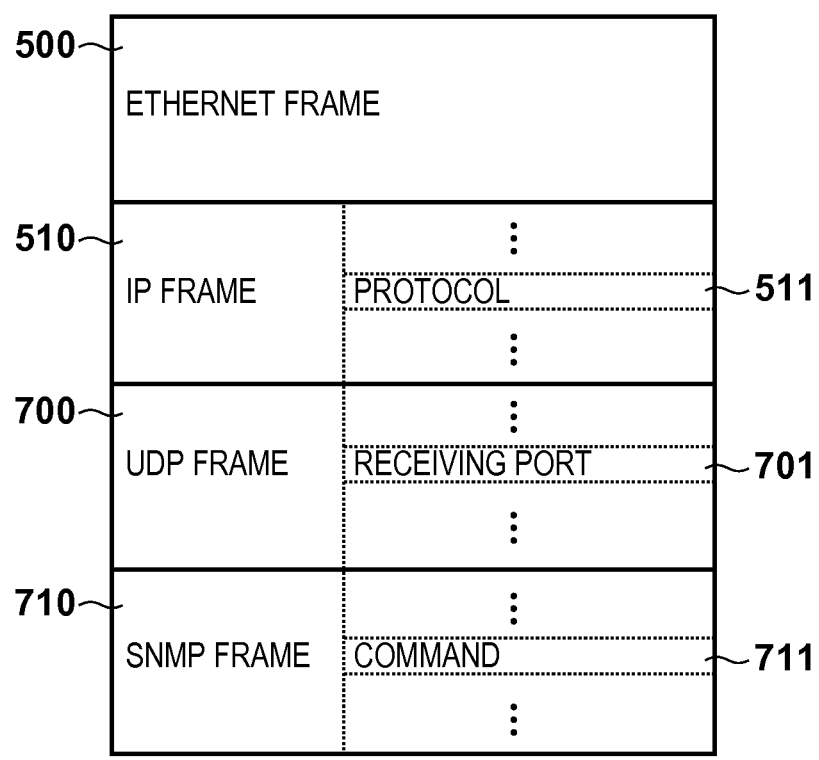
FIG. 7 illustrates an example of an SNMP packet in the second embodiment of the present invention.

Hereinafter, an example of processing in steps S402 to S405 will be described with reference to FIG. 7. FIG. 7 illustrates an example of an SNMP packet. In the packet, as in the case of HTTP access and IPP printing described in the first embodiment, a communication protocol is determined with reference to the protocol field 511 (S402, S403-1, and S403-2). If the value of a protocol field 511 is "0x11", it is determined that a UDP is designated and the received packet is a UDP packet. An UDP frame 700 is defined by RFC 768 and referenced to determine the port number (S402, S403-1, and S403-2). In the present embodiment, if the value of a destination port field 701 of the UDP frame 700 is "0x00a1", it is determined that port number 161 (SNMP) is designated as a port number for use in communication.

In the present embodiment, information included in an SNMP frame 710 is processed as a packet body (data section) (S404, S405). That is, the SNMP frame 710 is referenced to determine whether the received packet is a packet requesting for an operation that requires a change in the link rate (a change in the link rate to the first link rate). If the value of a command field 711 of the SNMP frame 710 is "0xa0", it is determined that the received packet is a "Get-Request" message. On the other hand, if the value of the command field 711 of the SNMP frame 710 is "0xa1", it is determined that the received packet is a "Get-NextRequest" message.

As has been described above, according to the present embodiment, even in the case, as with SNMP, where the amount of communication involved in provision of a service differs depending on the operation designated in the packet, a similar advantage to that of the first embodiment can be attained. That is, when the image processing apparatus receives a packet including a request for a network service, it is possible to perform communication at an appropriate communication rate that corresponds to the requested network service. This can prevent network errors and the like that may be caused by providing a service without changing the link rate from the second link rate.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-149753, filed Jul. 3, 2012 and 2013-098896, filed May 8, 2013, which are hereby incorporated by reference herein in their entirety.

What is claimed is:

1. An image processing apparatus that is capable of operating in a first power mode and in a second power mode in which less power is consumed than in the first power mode, and that communicates at a second communication speed when the image processing apparatus operates in the second power mode, the image processing apparatus comprising:

a determination unit configured to determine, when the image processing apparatus operating in the second power mode receives a packet, whether to shift the image processing apparatus to the first power mode with maintaining a communication speed at the second communication speed or to shift the image processing apparatus to the first power mode with changing the communication speed from the second communication speed to a first communication speed faster than the second communication speed, based on information included in a body part of the received packet; and a controlling unit configured to perform, in accordance with determination by the determination unit, any of first processing for shifting the image processing apparatus to the first power mode with maintaining the communication speed at the second communication speed, and second processing for shifting the image processing apparatus with changing the communication speed from the second communication speed to the first communication speed, wherein the image processing apparatus that has shifted to the first power mode by the first processing or the second processing performs processes the received packet, and at least in a case where the information included in the body part of the received packet indicates IPP printing, the determination unit determines to shift the image processing apparatus to the first power mode with changing the communication speed from the second communication speed to the first communication speed.

2. A method for controlling an image processing apparatus that is operating in a first power mode and in a second power mode in which less power is consumed than in the first power mode, and that communicates at a second communication speed when the image processing apparatus operates in the second power mode, the method comprising:

determining, when the image processing apparatus operating in the second power mode receives a packet, whether to shift the image processing apparatus to the first power mode with maintaining a communication speed at the second communication speed or to shift the image processing apparatus to the first power mode with changing the communication speed from the second communication speed to a first communication speed faster than the second communication speed, based on information included in a body part of the received packet;

controlling, in accordance with determination by the determination unit, any of first processing for shifting the image processing apparatus to the first power mode with maintaining the communication speed at the second communication speed, and second processing for shifting the image processing apparatus with changing the communication speed from the second communication speed to the first communication speed, wherein the image processing apparatus that has shifted to the first power mode by the first processing or the second processing performs processes the received packet, and at least in a case where the information included in the body part of the received packet indicates IPP printing, the determination unit determines to shift the image processing apparatus to the first power mode with changing the communication speed from the second communication speed to the first communication speed.

3. A non-transitory computer-readable storage medium storing a computer program for causing a computer to execute steps of the method for controlling an image processing apparatus that is capable of operating in a first power mode and in a second power mode in which less power is consumed than in the first power mode, and that communicates at a second communication speed when the image processing apparatus operates in the second power mode, the method comprising:

determining, when the image processing apparatus operating in the second power mode receives a packet, whether to shift the image processing apparatus to the first power mode with maintaining a communication speed at the second communication speed or to shift the image processing apparatus to the first power mode with changing the communication speed from the second communication speed to a first communication speed faster than the second communication speed, based on information included in a body part of the received packet;

controlling, in accordance with determination by the determination unit, any of first processing for shifting the image processing apparatus to the first power mode with maintaining the communication speed at the second communication speed, and second processing for shifting the image processing apparatus with changing the communication speed from the second communication speed to the first communication speed, wherein the image processing apparatus that has shifted to the first power mode by the first processing or the second processing performs processes the received packet, and at least in a case where the information included in the body part of the received packet indicates IPP printing, the determination unit determines to shift the image processing apparatus to the first power mode with changing the communication speed from the second communication speed to the first communication speed.

4. The image processing apparatus according to claim 1, wherein at least in a case where the information included in the body part of the received packet indicates an HTTP access request, the determination unit determines to shift the image processing apparatus to the first power mode with maintaining the communication speed at the second communication speed.

5. The image processing apparatus according to claim 1, wherein in a case where the image processing apparatus has shifted to the first power mode by the second processing, the controlling unit shifts, in response to completion of processing of the received packet, the image processing apparatus from the first power mode to the second power mode and further changes the communication speed from the first communication speed to the second communication speed.

6. The image processing apparatus according to claim 1, wherein the determination unit determines, in a case where a protocol designated in a header part of the received packet is a specific protocol and a port number designated in the header part of the received packet is a specific port number, whether to shift the image processing apparatus to the first power mode with maintaining the communication speed at the second communication speed or to shift the image processing apparatus to the first power mode with changing the communication speed from the second communication speed to the first communication speed, based on the information included in the body part of the received packet.

7. The image processing apparatus according to claim 6, wherein the specific protocol is TCP and the specific port number is 80.

8. The image processing apparatus according to claim 1, wherein the image processing apparatus is a printing apparatus.

* * * * *